United States Patent
Ohsawa et al.

(10) Patent No.: US 6,936,352 B2
(45) Date of Patent: Aug. 30, 2005

(54) MAGNETIC RECORDING MEDIUM WITH CONTROLLED LATTICE SPACING AND METHOD OF FORMING THEREOF

(75) Inventors: Michio Ohsawa, Kanagawa (JP); Akihiro Otsuki, Nagano (JP)

(73) Assignee: Fuji Electric Co., Ltd. (JP)

( * ) Notice: Subject to any disclaimer, the term of this patent is extended or adjusted under 35 U.S.C. 154(b) by 62 days.

(21) Appl. No.: 10/377,019

(22) Filed: Feb. 28, 2003

(65) Prior Publication Data

US 2004/0072028 A1 Apr. 15, 2004

(30) Foreign Application Priority Data

Feb. 28, 2002 (JP) ........................................ 2002-054713

(51) Int. Cl.$^7$ ................................................. G11B 5/66
(52) U.S. Cl. ..................... 428/611; 428/668; 428/669; 428/678; 428/686; 428/336; 428/694 TS
(58) Field of Search ................................ 428/611, 668, 428/669, 678, 686, 336, 694 TS

(56) References Cited

U.S. PATENT DOCUMENTS

| | | | |
|---|---|---|---|
| 5,736,262 A | | 4/1998 | Ohkijima et al. |
| 6,607,842 B2 | * | 8/2003 | Bian et al. .................. 428/611 |
| 6,641,936 B1 | * | 11/2003 | Chen et al. ............ 428/694 TS |
| 2001/0053458 A1 | * | 12/2001 | Suzuki et al. ............... 428/611 |
| 2002/0064689 A1 | * | 5/2002 | Yamanaka et al. ... 428/694 TM |
| 2002/0064691 A1 | * | 5/2002 | Kanbe et al. .......... 428/694 TS |
| 2002/0187368 A1 | * | 12/2002 | Senzaki et al. .......... 428/694 T |
| 2003/0087131 A1 | * | 5/2003 | Oikawa et al. ............. 428/693 |

FOREIGN PATENT DOCUMENTS

| | | |
|---|---|---|
| JP | 60231911 A | 11/1985 |
| JP | 9147349 A | 6/1997 |
| JP | 2000 099935 A | 4/2000 |
| JP | 2001 101651 A | 4/2001 |

OTHER PUBLICATIONS

Djayaprawira; Improvement of Magnetic and R/W Properties in Longitudinal Media by Using CrX/Cr Dual Underlayer; IEEE Transactions on Magnetics, Jul. 2001; pp. 1497–1499; vol. 37, No. 4.

"High Coercivity Recording Media Prepared Using Non-heating Process."; H. Ohmori et al.; Journal of The Magnetics Society of Japan; 2001 vol. 25; pp. 607–610.

"High Coercivity Longitudinal Recording Medium Prepared Using Non–Heating Process"; H. Ohmori et al.; IEEE Transactions on Magnetics; vol., 37, No. 4; Jul. 2001; pp. 1488–1490.

* cited by examiner

Primary Examiner—Kevin M. Bernatz
(74) Attorney, Agent, or Firm—Rossi, Kimms & McDowell

(57) ABSTRACT

A magnetic recording medium can be produced without substrate heating during sputtering. The recording medium has a substrate, an underlayer of a nonmagnetic film with a bcc structure formed on the substrate, an intermediated layer of a nonmagnetic film with an hcp structure formed on the underlayer, a magnetic layer of a magnetic film with an hcp structure formed on the intermediate layer, and a protective layer formed on the magnetic layer. Materials used for the underlayer, the intermediate layer, and the magnetic layer has spacings between principal lattice planes of the respective crystals that can be expresses as d1 (between (110) planes in the underlayer)>d2 (between (002) planes in the intermediate layer)>d3 (between (002) planes in the magnetic layer).

18 Claims, 5 Drawing Sheets

MAGNETIC RECORDING MEDIUM WITH CONTROLLED LATTICE SPACING AND METHOD OF FORMING THEREOF

BACKGROUND

A conventional magnetic recording medium used in a hard disc drive (HDD) of a computer comprises an underlayer 2, an intermediate layer 3, a magnetic layer 4, and a protective layer 5, sequentially formed on a substrate 1 of aluminum or glass, as schematically illustrated in FIG. 7. Information is recorded in the magnetic layer 4 as a magnetized recording bit on the magnetic recording medium. Of such recording media, a medium in which a direction of magnetization of the recording bit is in a horizontal direction (or in-plane direction) in relation to the substrate surface is called a horizontal (or longitudinal or in-plane) recording medium. A medium in which the magnetization direction of the recording bit is in a vertical direction is called a vertical (or perpendicular) recording medium. All media in practical use to date are of horizontal recording system. However, the vertical recording media are being actively pursued in recent years.

The magnetic layer 4 is generally composed of a polycrystalline thin film of a cobalt system in which fine crystallites of cobalt are formed into a film shape. Each cobalt crystallite has a hexagonal closest packed (hcp) structure of a hexagonal crystal system. To record information by magnetizing the magnetic layer 4 with this structure in the horizontal (in-plane) direction in relation to the surface of the substrate 1, the polycrystalline magnetic film of the cobalt system must be formed so that the axis of easy magnetization, namely the c-axis of the a- and c-axes shown in FIG. 8, orients with preference in the horizontal (in-plane) direction in relation to the substrate 1. In a perpendicular recording medium, the cobalt c-axis must be predominantly oriented vertically to the substrate 1.

It is desirable to minimize the size of each crystal grain to achieve a high recording density. In addition, it is desirable to isolate and separate the crystal grains from each other so that magnetic interaction between the crystal grains decreases. To this end, polycrystalline thin film of a CoCr system has been used for the magnetic layer 4. This cobalt alloy containing 10 to 20% of chromium separates into a cobalt-rich ferromagnetic phase and a chromium-rich nonmagnetic phase by a phase separation. The chromium-rich nonmagnetic phase tends to precipitate at the grain boundary. Thus, the cobalt-rich ferromagnetic crystal grains are made minute, and isolated and separated from each other. To minimize and separate the crystal grains and, at the same time, to accomplish the predominant c-axis alignment in the horizontal (in-plane) direction, an underlayer of a polycrystalline thin film made of chromium or chromium alloy is formed on the substrate of aluminum or glass, and a magnetic layer of CoCr system is formed on this underlayer.

There are two reasons why chromium or chromium alloy has been used for the underlayer. First, the magnetic layer 4 is a material of a CoCr system; the chromium-rich nonmagnetic phase precipitates surrounding the cobalt-rich ferromagnetic crystalline grains. Consequently, chromium of the underlayer 2 aids to minimize and separate the crystalline grains in the magnetic layer 4 by promoting precipitation of the chromium-rich nonmagnetic phase in the magnetic layer 4. Second, the chromium in the underlayer has an effect to predominantly align the c-axis of the cobalt crystal of the magnetic layer 4 in a horizontal (or in-plane) direction. This effect arises from good lattice matching of the chromium with the CoCr alloy crystal although chromium has a body centered cubic (bcc) structure belonging to a cubic crystal system. Such a magnetic recording medium is produced by sequentially forming a chromium underlayer, a CoCr alloy magnetic layer, and a carbon protective layer on a disk shape aluminum substrate with a NiP plating by means of a sputtering method. A magnetic recording medium using a glass substrate is similarly produced by sequentially forming a NiAl seed layer, a chromium underlayer, a CoCr magnetic layer, and a protective layer on a glass substrate by means of sputtering.

In a conventional magnetic recording medium using a CoCr magnetic layer, a chromium underlayer, and a substrate of aluminum or glass, however, the substrate needs to be heated to a temperature between about 200° C. and 300° C., while the magnetic layer is being formed by a sputtering method. Without the substrate heating, a high coercive force Hc required for achieving high recording density cannot be attained. The magnetic layer, however, can be formed with high coercive force by using a relatively high concentration of platinum in the range from 5 to 10% with respect to cobalt atoms contained in the CoCr magnetic layer. Even if the magnetic layer containing relatively high concentration of platinum is used, however, high coercive force cannot be attained without substrate heating when a chromium underlayer is used. It has been theorized that if substrate heating is not executed, phase separation of the CoCr alloy into a cobalt-rich phase and a chromium-rich phase does not sufficiently progress, thus insufficiently isolating the cobalt crystalline grains; predominant in-plane alignment of the c-axis of the cobalt crystals will also be insufficient. Because a plastic substrate cannot allow substrate heating in a deposition process, a magnetic recording medium that copes with high recording density cannot be manufactured using a plastic substrate. A magnetic recording medium using an aluminum substrate or a glass substrate is also more expensive because it requires substrate heating during sputtering. Accordingly, there is a need to provide a way of avoiding substrate heating during the manufacture of a magnetic recording medium having excellent magnetic property. The present invention addresses this need.

SUMMARY OF THE INVENTION

The present invention relates in general to a magnetic recording medium and a method of forming thereof, and in particular to a magnetic recording medium used in a HDD and the like, which can be mounted on equipment such as computers, network terminal devices, audio visual (AV) apparatuses, and smart appliances, etc.

One aspect of the present invention is a magnetic recording medium having a substrate, an underlayer with a body centered cubic (bcc) crystal structure formed on the substrate, an intermediated layer with a hexagonal closest packed (hcp) crystal structure formed on the underlayer, a magnetic layer composed principally of cobalt with the hcp structure formed on the intermediate layer, and a protective layer formed on the magnetic layer. The spacing relationship is such that d1>d2>d3, where d1 is a spacing between (110) planes of the underlayer; d2 is a spacing between (002) planes of the intermediate layer; and d3 is a spacing between (002) planes in the magnetic layer.

Another aspect of the present invention is a method of forming the magnetic recording medium by forming the underlayer with a body centered cubic crystal structure on the substrate, forming the intermediated layer with a hexagonal closest packed crystal structure on the underlayer, forming the magnetic layer composed principally of cobalt with the hexagonal closest packed structure on the intermediate layer, and forming the protective layer on the magnetic layer, again the spacings d1>d2>d3.

The spacings can be further expressed as follows: 0.0<(d1−d2)/d1<0.1 and/or 0.0<(d2−d3)/d2<0.1, more specifically, 0.02≦(d1−d2)/d1 and/or 0.02≦(d2−d3)/d2.

The underlayer can be principally composed of Ta, Nb, W, or Mo. The thickness of the underlayer can be in the range of 5 to 20 nm. The underlayer can comprise a first underlayer with a body centered cubic crystal structure formed on the substrate and a second underlayer with a body centered cubic crystal structure formed between the first underlayer and the intermediate layer, with d6>d7>d2, where d6 is a spacing between (110) planes in the first underlayer and d7 is a spacing between (110) planes in the second underlayer.

The intermediate layer can be principally composed of Ru, Re, Os, or Tc, or an intermetallic compound selected from $Rh_3W$, $Ni_3Sn$, $Ni_3Zr$, and $Co_3W$. The thickness of the intermediate layer can be in the range of 5 to 50 nm. The intermediate layer can have a first intermediate layer with a hexagonal crystal structure formed on the underlayer and a second intermediate layer with a hexagonal crystal structure formed between the first intermediate layer and the magnetic layer, and with d1>d4>d5>d3, where d4 is a spacing between (002) planes of the first intermediate layer and d5 is a spacing between (002) planes of the second intermediate layer.

The magnetic layer can contain a nonmetallic element or a nonmetallic compound in a proportion from 5 to 20 mol % with respect to content of the cobalt. Specifically, the magnetic layer can contain platinum in a proportion of 10 to 50 at % with respect to content of the cobalt. The thickness of the magnetic layer can be in the range of 5 to 20 nm. The direction of magnetization for recording information in the magnetic layer is horizontal in relation to the substrate.

The magnetic recording medium can further include a seed layer composed of an intermetallic compound with a composition of CoTi, CoZr, CuZr, FeTi, or NiTi.

At least one of the underlayer, the intermediate layer, the magnetic layer, and the protective layer is formed by sputtering.

DETAILED DESCRIPTION

Now, aspects of embodiments of the present invention will be described in detail in the following with reference to accompanying drawings. In the following description, "principally composed of" generally means containing more than about 50 at. %, unless specifically identified otherwise.

Figure 1:
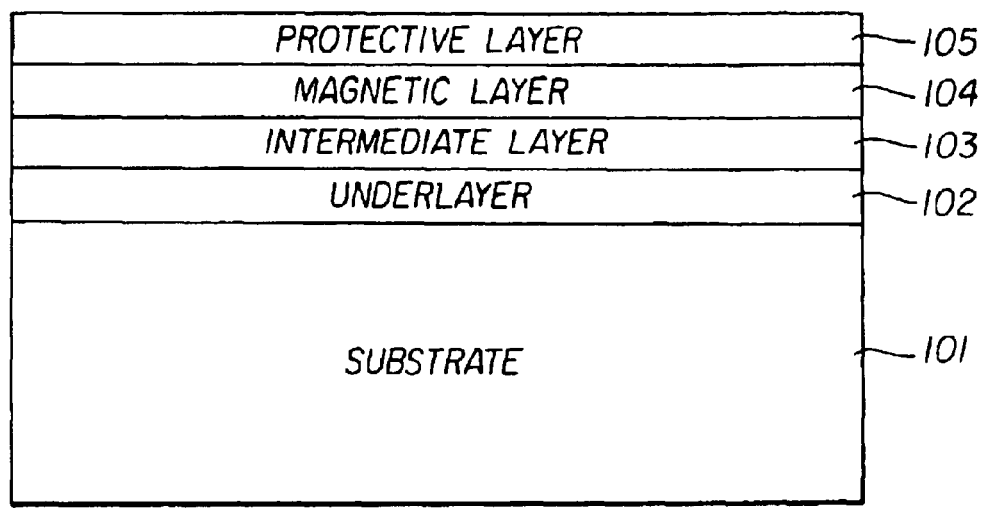
FIG. 1 schematically illustrates a cross sectional view of a magnetic recording medium of first embodiment according to the present invention.

FIG. 1 is a cross sectional view showing a construction of a magnetic recording medium according to the first embodiment of the present invention. The magnetic recording medium has an underlayer 102 of a nonmagnetic film with a body centered cubic (bcc) crystal structure formed on a substrate 101. On the underlayer 102 is an intermediate layer 103 of a nonmagnetic film with a hexagonal closest packed (hcp) crystal structure. On the intermediate layer 103 is a magnetic layer 104 for recording information of a magnetic film principally composed of cobalt, and having a hexagonal closest packed crystal structure, wherein a direction of magnetization is horizontal in relation to the substrate 101. On the magnetic layer 104 is a protective layer 105 for protecting the magnetic layer and a magnetic head (not illustrated).

Figure 2:
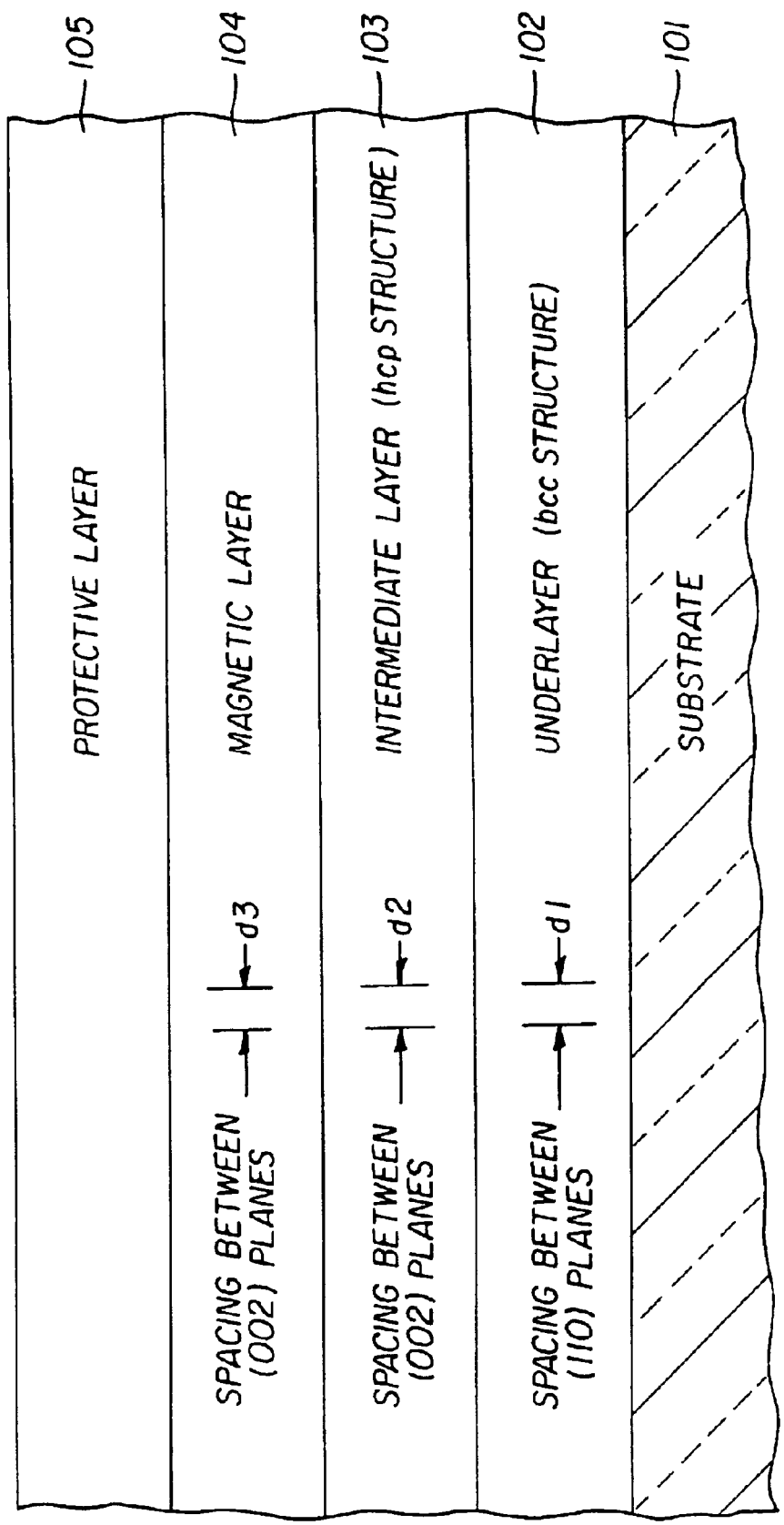
FIG. 2 schematically illustrates the definitions of the spacings of the lattice planes perpendicular to the substrate in the layers of the magnetic recording medium of FIG. 1.

FIG. 2 illustrates the definitions of spacings d1, d2, and d3 of the lattice planes vertically to the substrate in the layers of the magnetic recording medium of FIG. 1. The spacing d1 is the spacing between (110) planes in the underlayer 102, the spacing d2 is the spacing between (002) planes in the intermediate layer 103, and the spacing d3 is the spacing between (002) planes in the magnetic layer 104. The spacings between the crystal lattice planes of the materials used for the underlayer 102, the intermediate layer 103, and the magnetic layer 104 can be expressed as d1>d2>d3.

Misfit Δ1 of the spacings of the lattice planes between the underlayer and the intermediate and misfit Δ2 of the spacings of the lattice planes between the intermediate layer and the magnetic layer can be expressed as Δ1=(d1−d2)/d1 and Δ2=(d2−d3)/d2. Thus, the misfits can be expressed as: 0.0<Δ1<0.1 and 0.0<Δ2<0.1.

Figure 3:
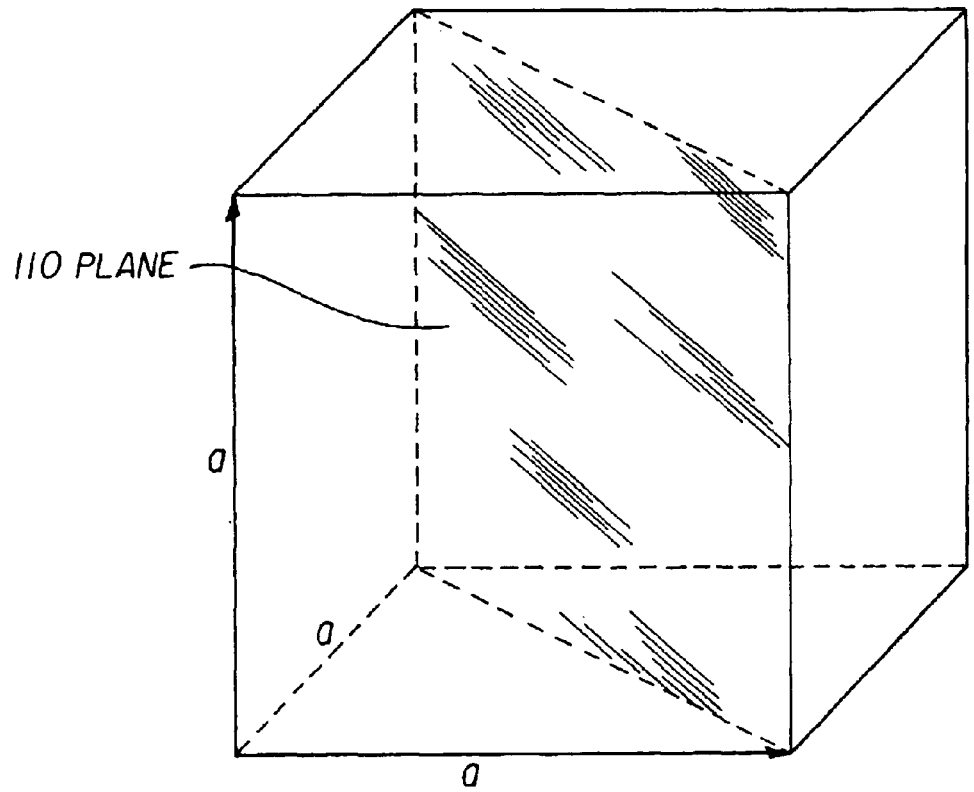
FIG. 3 schematically illustrates a bcc crystal structure.
Figure 4:
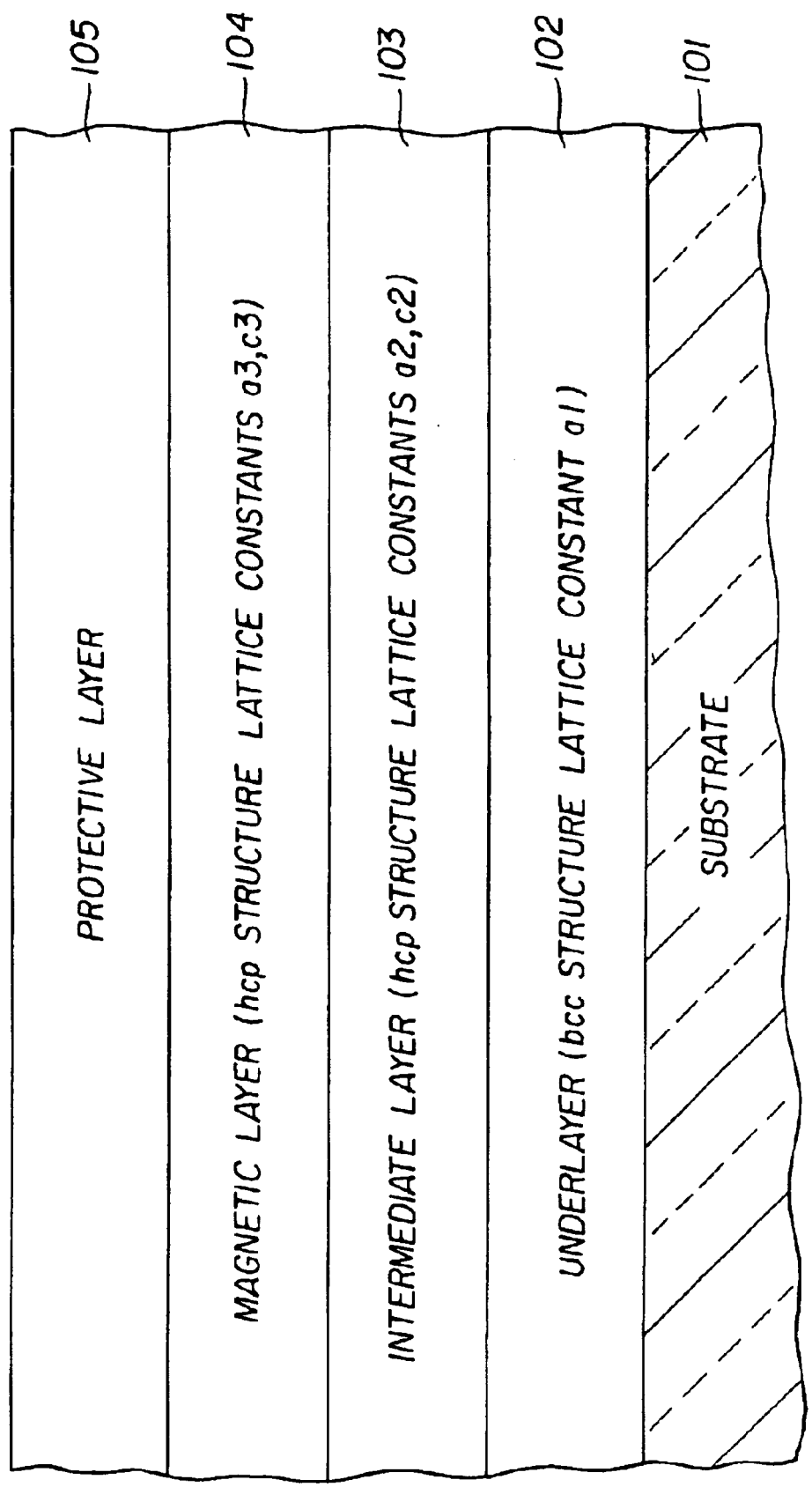
FIG. 4 illustrates the lattice constants in the layers of the magnetic recording medium of FIG. 1.
Figure 5:
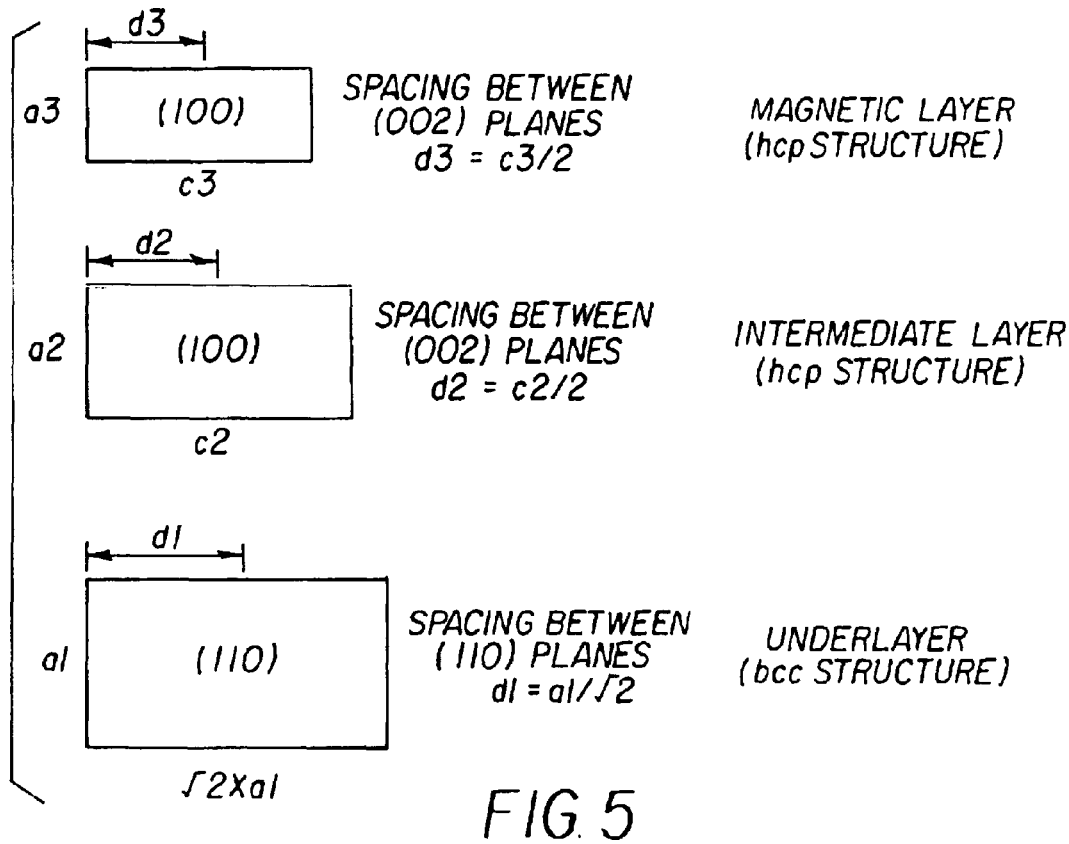
FIG. 5 illustrates the relationship between the spacings of the lattice planes and the lattice constants in the layers of a magnetic recording medium of FIG. 1.
Figure 8:
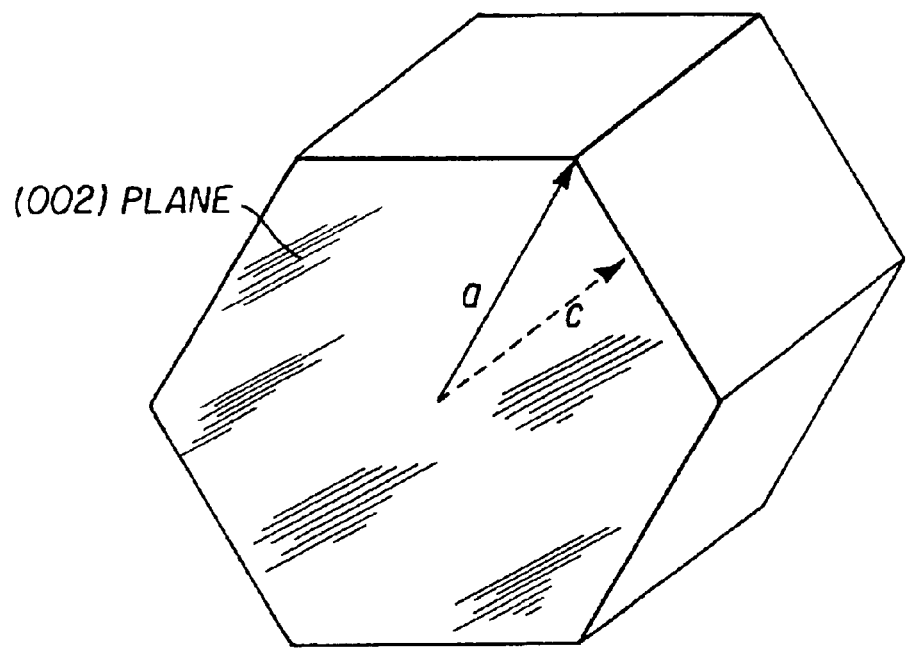
FIG. 8 schematically illustrates an hcp crystal structure.

Each of the spacings of lattice planes d1, d2, and d3 of the underlayer 102, the intermediate layer 103, and the magnetic layer 104, respectively, has the following relationship with the lattice constant of each crystal lattice. There exists only one lattice constant 'a' in a bcc structure as shown in FIG. 3. If a1 is a lattice constant in the underlayer 102 as shown in FIG. 4, the spacing d1 between (110) planes can be expressed as d1=a1/√2. There exist two lattice constants 'a' and 'c' as shown in FIG. 8 in the intermediate layer 103 and in the magnetic layer 104, both of which have an hcp structure. References a2 and c2 are the lattice constants in the intermediate layer 103, and references a3 and c3 are the lattice constants in the magnetic layer 104, as shown in FIG. 4. The spacing d2 of the lattice planes in the intermediate layer 103 and the spacing d3 of the lattice planes in the magnetic layer 104 can be expressed as d2=c2/2 and d3=c3/2, respectively. FIG. 5 summarizes the relations between the spacings of the lattice planes and the lattice constants. The above expressions can be transformed as a1/√2>c2/2>c3/2; 0.0<Δ1=(a1/√2−c2)/2)/a1/√2<0.1; and 0.0<Δ2=(c2−c3)/c2<0.1.

The magnetic recording medium according to the first embodiment can be manufactured under the following method. An underlayer 102 with a bcc structure is formed on a substrate 101, which can be plastic, by a sputtering method. When the underlayer having a bcc structure is formed by sputtering, each crystal grain thereof generally grows in the direction where the crystal planes of (100), (110), (111), or (211) is parallel to the substrate surface. In a crystalline grain with the bcc structure, any growth type based on the above mentioned crystal planes has a (110) crystal plane in the direction vertical to the substrate surface.

An intermediate layer 103 with an hcp structure having a spacing d2 between (002) planes vertical to the substrate surface is formed on the underlayer 102, with the spacing d2 smaller than the spacing d1.

The spacing d1 of the lattice planes in the underlayer 102 and the spacing d2 of the lattice planes in the intermediate layer 103 can be expressed as d1>d2, where d1=(d(110) in the underlayer) and d2=(d(002) in the intermediate layer), and where d(h k l) is a spacing of lattice planes represented by a Miller index (h k l).

The crystals in the intermediate layer with the hcp structure generally include (101) planes that have a spacing of the lattice planes nearly equal to the spacing d2 of (002) planes. The (002) planes, which are perpendicular to the c-axis, are important for controlling the direction of the c-axis. On the other hand, because the (101) planes are in an acute angle with the c-axis, the growth of the (101) planes disturbs controlling of the c-axis orientation. The spacing of (101) lattice planes is smaller than the spacing d2 of (002) planes in a crystal with an hcp structure. That is, d2>(d(101) in the intermediate layer), where d2=(d(002) in the intermediate layer). The spacing d(h k l) of the lattice planes in a hexagonal crystal system can be represented in terms of the lattice constants a and c by the following expression: $1/d(h k l)^2 = 4(h^2+hk+k^2)/3a^2 + l^2/c^2$.

In an hcp structure, c/a is about 1.63. From the above equation and the value c/a=1.63, the following expression can be deduced: d(101)=d(002), which is <c/2. Consequently, a lattice matching relation between the underlayer 102 and the intermediate layer 103 can be expressed by ((d(110) of the underlayer)−(d(002) of the intermediate layer))<((d(110) of the underlayer)−(d(101) of the intermediate layer)). That is, d1−d2<d1−(d(101) of the intermediate layer). Therefore, the lattice matching with respect to the (110) planes in the crystalline grain of the underlayer 102, the (110) plane being vertical to the substrate surface, is worse for the (101) planes in the intermediate layer than for the (002) planes in the intermediate layer. As a result, in initial growth of the crystalline grains in the intermediate layer 103, the (002) planes show greater tendency than the (101) planes to grow vertically to the substrate surface in continuation with the (110) plane of the underlayer 102. In other words, the crystals in the intermediate layer 103 initially grow so that the c-axis predominantly aligns parallel to the substrate surface.

Further, in the relationship (d(110) of the underlayer)>(d(002) in the intermediate layer), the misfit Δ1 of the spacings of the lattice planes between the two layers satisfies the following relationship: $0.0<\Delta1=(d1-d2)/d1<0.1$. That is, the lattice misfit is less than 10%. Accordingly, the crystals in the intermediate layer 103 can be considered to grow to a certain size with the c-axis predominantly aligning horizontally.

A magnetic layer 104 is formed on such an intermediate layer 103 that is grown with the alignment in which the c-axis is parallel to the substrate surface, as described above. The crystals of the magnetic layer 104 with the hcp structure have a spacing d3 of the lattice planes in the c-axis direction smaller than the spacing d2 of the lattice planes in the intermediate layer 103 and a misfit with the intermediate layer smaller than 10%. Then, the spacings can be expressed as d2>d3, where d2=(d(002) in the intermediate layer) and d3=(d(002) in the magnetic layer). Since the magnetic layer 104 is composed of crystals of cobalt system with the hcp structure, d2>(d(101) in the magnetic layer), where d2=(d(002) in the magnetic layer). Consequently, a lattice matching relation between the intermediate layer and the magnetic layer 104 can be expressed as ((d(002) in the intermediate layer)−(d(002) in the magnetic layer))<((d(002) in the intermediate layer)−(d(101) in the magnetic layer)). That is, d2−d3<d2−(d(101) in the magnetic layer).

Therefore, lattice matching with respect to the (002) planes in the intermediate layer 103, which is vertical to the substrate surface, is superior for the (002) planes in the magnetic layer 104 than for the (101) planes in the magnetic layer 104. As a result, the magnetic layer initially grows with a tendency of the (002) planes thereof vertical to the substrate surface. In other words, the crystals in the magnetic layer 104 initially grow so that the c-axis predominantly aligns parallel to the substrate surface.

Further, in the relationship where (d(002) of the intermediate layer)>(d(002) in the magnetic layer), the misfit Δ2 of spacings of lattice planes between the two layers can be expressed as $0.0<\Delta2=(d2-d3)/d2<0.1$. That is, the lattice misfit is less than 10%. Accordingly, the crystals in the magnetic layer 104 can be considered to grow to a certain size with the c-axis predominantly aligning horizontally. Thus, the c-axis in the intermediate layer 103 is aligned parallel to the substrate surface, and in the influence of such an intermediate layer 103, the c-axis in the magnetic layer 104 has a stronger alignment parallel to the substrate surface than in the intermediate layer 103. Because the c-axis alignment becomes stronger in the upper layer as in the order of the underlayer 102, the intermediate layer 103, and the magnetic layer 104, the c-axis of the crystalline grains in the magnetic layer 104 in such lattice configuration can be expected to predominantly align parallel to the substrate surface even if substrate heating is omitted in the film forming process.

Among the underlayer 102, the intermediate layer 103, and the magnetic layer 104, the following relationship exists: spacing d1 between (110) planes in the underlayer>spacing d2 between (002) planes in the intermediate layer>spacing d3 between (002) planes in the magnetic layer. In addition, the misfit of the spacings of the lattice planes at the interface between the layers is less than 10%. Therefore, the grain size in the horizontal direction of the intermediate layer 103 tends to be nearly the same size or smaller than that of the underlayer 102, and the grain size in the horizontal direction of the magnetic layer 104 tends to be nearly the same size or smaller than that of the intermediate layer 103. As a result, the size of the crystalline grains in the magnetic layer 104 can be minimized.

Because the spacing of the lattice planes in an upper layer is smaller than that of the corresponding spacing of a lower layer, the intermediate layer 103 is likely to generate a gap at the grain boundary than the underlayer 102, and the magnetic layer 4 is likely to generate a gap at the grain boundary than the intermediate layer 103. Therefore, minimization and isolation (or separation) of the crystalline grains can be achieved without substrate heating in the film forming process. To promote this tendency, it is preferable to increase the misfit of the spacings of the lattice planes between the layers, as long as predominant alignment of the c-axis in the horizontal direction is sufficiently attained.

Although such materials are selected in manufacturing a conventional magnetic recording medium that the misfit between the layers is minimum, the misfit between each pair of layers in the present invention is confined in the limited range to achieve excellent magnetic performance. In particular, the relationships $0.02 \leq (d1-d2)/d1$ and $0.02 \leq (d2-d3)/d2$ are preferable features of the present invention.

Because minimization and isolation of the crystalline grains are easily attained in the magnetic layer 104 of the invention, an element or a compound that is likely to precipitate at the grain boundary is promoted to precipitate homogeneously at the grain boundary of the cobalt crystal in the magnetic layer 104. Consequently, excellent fine structure is accomplished in the magnetic layer of a magnetic recording layer. Even using those magnetic materials, the c-axis in the intermediate layer 103 still tends to align in the horizontal direction. Accordingly, the c-axis of the cobalt crystal in the magnetic layer 104 aligns more strongly in the horizontal direction in relation to the substrate surface than in the intermediate layer 103.

When a material of CoPt system containing 10 to 50 at % of platinum with respect to cobalt is used for the magnetic layer aiming at high coercive force, the spacing of lattice planes of the cobalt crystal in the magnetic layer 104 increases a little by solid solution of the platinum atoms. In that case, if a material with an hcp structure in which a spacing between (002) planes is larger than the spacing of (002) planes of the cobalt crystal including platinum atoms of solid solution, it is expected to promote solid solution of the platinum atoms into the cobalt crystals, leading to further higher coercive force.

Preferably, the magnetic layer contains a nonmetallic element or compound in a proportion from 5 to 20 at % with respect to the content of cobalt. Preferably, the thickness of the underlayer is in the range of 5 to 20 nm, the thickness of the intermediate layer is in the range of 5 to 50 nm, and the thickness of the magnetic layer is in the range of 5 to 50 nm.

The underlayer in the above-described layer construction can be composed of Nb, W, or Mo as well as Ta. These metals have a bcc crystal structure and are nonmagnetic. As shown in Table 1, the spacings between (110) planes of these metals are larger than the spacing of 2.142 Å between the (002) planes of the ruthenium used for the intermediate layer, and the misfits are smaller than 10%. An alloy principally composed of these metals can also be used for the underlayer.

TABLE 1

|    | Crystal Structure | Spacing between (110) Planes (Å) | Misfit with Ru (002) (%) |
|----|-------------------|----------------------------------|--------------------------|
| Ta | bcc               | 2.338                            | 8.4                      |
| Nb | bcc               | 2.336                            | 8.3                      |
| W  | bcc               | 2.238                            | 4.3                      |
| Mo | bcc               | 2.225                            | 3.7                      |

The intermediate layer can be composed of Os, Re, or Tc, as well as Ru, to decrease misfit and improve lattice matching. These metals have an hcp crystal structure and are nonmagnetic. As shown in Table 2, the spacings between (002) planes of these metals are larger than the spacing between the (002) planes of cobalt, and the misfits are smaller than 10%. When about 20 at % of platinum is added to the magnetic layer that is principally composed of cobalt, the spacing of (002) planes of the cobalt crystals increases by about 3%. An alloy principally composed of these metals also can be used for the intermediate layer.

TABLE 2

|    | Crystal Structure | Spacing between (002) Planes (Å) | Misfit with Co (002) (%) |
|----|-------------------|----------------------------------|--------------------------|
| Os | hcp               | 2.160                            | 6.3                      |
| Re | hcp               | 2.226                            | 9.1                      |
| Tc | hcp               | 2.199                            | 8.0                      |
| Ru | hcp               | 2.142                            | 5.6                      |
| Co | hcp               | 2.023                            | 0.0                      |

The intermediate layer can be principally composed of the alloys or intermetallic compounds shown in Table 3. The crystal structure of these alloys is classified into a hexagonal crystal system having the space group of P63/mmc, which is same as that of cobalt; thus, the crystal structure of the alloys are similar to that of the cobalt. Here, "principally composed of" means containing more than about 50% in molar proportion.

TABLE 3

|                    | Crystal Structure | Spacing between (002) Planes (Å) | Misfit with Co (002) (%) |
|--------------------|-------------------|----------------------------------|--------------------------|
| WRh$_3$            | hexagonal         | 2.174                            | 6.9                      |
| Ni$_3$Sn           | hexagonal         | 2.126                            | 4.8                      |
| Ni$_3$Zr           | hexagonal         | 2.121                            | 4.6                      |
| Co$_3$W            | hexagonal         | 2.060                            | 1.8                      |
| Co                 | hcp               | 2.023                            | 0.0                      |

Figure 6:
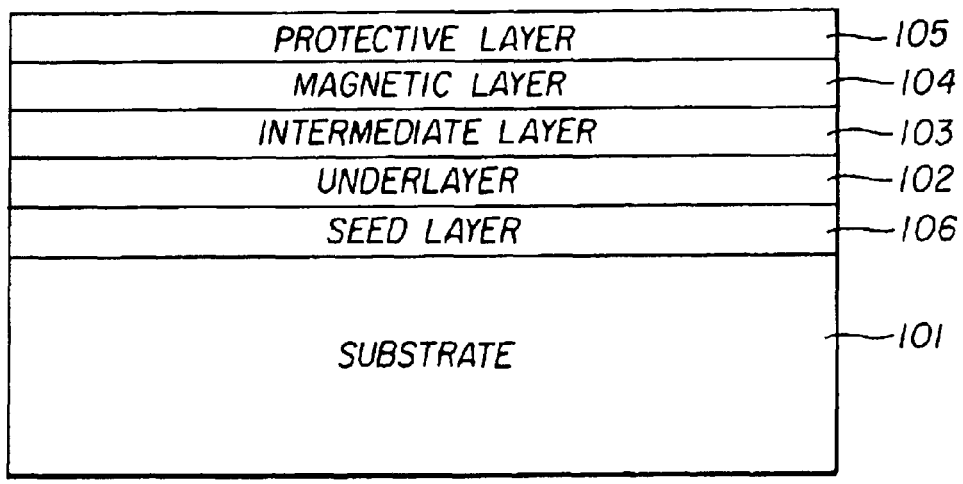
FIG. 6 schematically illustrates the cross sectional view of a magnetic recording medium of a second embodiment according to the present invention.
Figure 7:
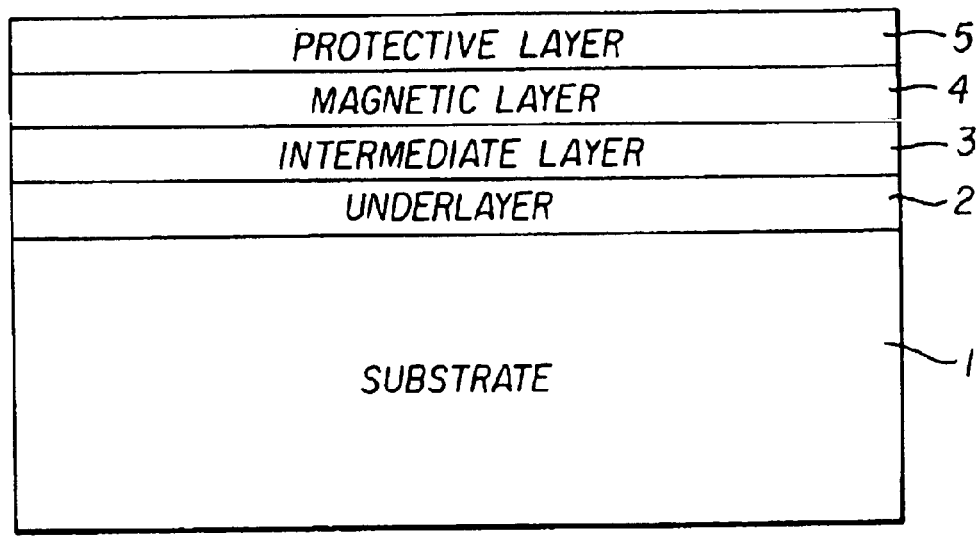
FIG. 7 schematic illustrates a cross section of a conventional magnetic recording medium.

FIG. 6 is a cross sectional view showing a construction of the second aspect of embodiment of a magnetic recording medium according to the invention. A magnetic recording medium of this aspect of embodiment comprises a seed layer 106 on the substrate 101 to improve the crystal alignment. An underlayer 102 of a nonmagnetic film with a bcc structure is formed on the seed layer 106. An intermediated layer 103 of a nonmagnetic film with an hcp structure is formed on the underlayer 102. A magnetic layer 104 of a magnetic film with an hcp structure is formed on the intermediated layer 103. A protective layer 105 is formed on the magnetic layer 104.

The crystals of the seed layer have a bcc lattice, which is the same as that of the underlayer, and the space group Pm3m. Thus, the crystal structure of the seed layer is similar to that of the underlayer 102 and exhibits superior lattice matching with the underlayer 102. Two component elements of the seed layer have a tendency to deposit alternately on the substrate. This tendency is similar to the case where a seed layer of NiAl is used under an underlayer of chromium in a magnetic recording medium comprising an underlayer of chromium, a magnetic layer of CoCr, and a glass substrate.

As a result, the seed layer crystals exhibit a tendency for (211) planes thereof to align parallel to the substrate surface. Because the (211) plane of the underlayer 102 matches well to a (100) plane of the hcp lattice, alignment of the intermediate layer 103 improves and in-plane alignment of the c-axis increases. As a consequence, in-plane alignment of the c-axis of the magnetic layer 104 enhances as well.

This aspect of embodiment provides a seed layer of a thin film composed, for example, of the binary alloys or intermetallic compounds shown in Table 4 under an underlayer.

TABLE 4

|      | Crystal Structure | Spacing between (110) Planes (Å) | Misfit with Ta (110) (%) |
|------|-------------------|----------------------------------|--------------------------|
| CoTi | cubic system      | 2.111                            | 10.7                     |
| CoZr | cubic system      | 2.260                            | 3.5                      |
| CuZr | cubic system      | 2.306                            | 1.4                      |
| FeTi | cubic system      | 2.104                            | 11.1                     |
| NiTi | cubic system      | 2.120                            | 10.3                     |
| Ta   | bcc               | 2.338                            | 0.0                      |

The lattice misfits for the case of a tantalum underlayer are given in Table 4. CoZr and CuZr exhibit small values of lattice misfit with tantalum and are suitable for producing a magnetic recording medium applying the present invention. Although CoTi, FeTi, and NiTi exhibit relatively large values of misfit with tantalum, the misfit can be made smaller when tungsten or molybdenum having a smaller spacing between (110) planes than tantalum is used for the material of the underlayer. Accordingly, the alloys are also suitable for producing a magnetic recording medium applying the present invention.

The intermediate layer can be composed of first intermediate layer and second intermediate layer that have a crystal structure classified into a hexagonal crystal system. A magnetic recording medium in that embodiment comprises an underlayer, first intermediate layer, second intermediate layer, a magnetic layer, and a protective layer sequentially formed on a substrate. Preferably, the following relationship exists among the spacing d1 between (110) planes in the underlayer, the spacing d4 between the (002) planes in the first intermediate layer, the spacing d5 between the (002) planes in the second intermediate layer, and the spacing d3 between the (002) planes in the magnetic layer: d1>d4>d5>d3. A seed layer may be provided between the substrate and the underlayer.

The underlayer can be composed of first underlayer and second underlayer that have a bcc structure. A magnetic recording medium in this aspect of embodiment can comprise a first underlayer, a second underlayer, an intermediate layer, a magnetic layer, and a protective layer sequentially formed on a substrate. Preferably, the following relationship exists among the spacing d6 between the (110) planes in the first underlayer, the spacing d7 between the (110) planes in the second underlayer, the spacing d2 between the (002) planes in the intermediate layer, and the spacing d3 between the (002) planes in the magnetic layer: d6>d7>d2. A seed layer can be provided between the substrate and the underlayer.

The present invention will be described more in detail with reference to some examples of preferred embodiments. In the first example, an underlayer of a tantalum film, an intermediate layer of ruthenium film, a magnetic layer of a cobalt system, and a protective layer of a carbon protective film were formed on a plastic substrate by a sputtering method. Table 5 gives the crystal structures, the spacings of the lattice planes that are essential for the c-axis alignment control of the crystals of cobalt system, for Ta, Ru, and Co. The table also gives the misfits of the spacings of the lattice planes at the interface between the intermediate layer and the underlayer and at the interface of the magnetic layer and the intermediate layer.

TABLE 5

|                           | Ta Underlayer | Ru Intermediate Layer | Co Magnetic Layer |
|---------------------------|---------------|-----------------------|-------------------|
| Lattice Structure         | bcc           | hcp                   | hcp               |
| Essential Lattice Plane   | (110)         | (002)                 | (002)             |
| Spacing between Lattice Planes (Å) | 2.338 | 2.142              | 2.023             |
| Misfit at Interface (%)   | 8.4           | 5.6                   |                   |

The magnetic layer was contained by 20 at % of platinum, 10 at % of chromium, and 10 mol % of $SiO_2$ as a nonmetallic component, with respect to the cobalt content. By the effect of the platinum atoms contained at the interstices in the cobalt crystal lattice, the spacing between (002) planes of the cobalt crystals becomes about 2.08 Å. Consequently, actual misfit at the interface between the magnetic layer and the intermediate layer is supposed to be about 3%. The sputtering gas used was 100% argon. The sputtering conditions are shown in Table 6.

TABLE 6

Deposition Condition

|                    | Underlayer | Intermediate Layer | Magnetic Layer |
|--------------------|------------|--------------------|----------------|
| Gas Pressure (mTorr) | 5        | 70                 | 5              |
| Power (W)          | 570        | 440                | 700            |

The predetermined thickness and the value observed by a TEM for each layer are shown in Table 7. The samples were prepared by means of an ion milling method using PIPS Model 691. The TEM observation was conducted by a field emission transmission electron microscope, type JEM 2010F.

TABLE 7

Layer Thickness

|                       | Predetermined (nm) | TEM Observation (nm) |
|-----------------------|--------------------|----------------------|
| Magnetic Layer        | 8                  | 9.1                  |
| Ru Intermediate Layer | 15                 | 21.7                 |
| Ta Underlayer         | 15                 | 15.4                 |

A mean grain size in the planar direction and a standard deviation for each layer were obtained by TEM observation. The results are given in Table 8. The grain size analysis was executed by a dark field tracing method using an image analyzer, type Luzes-FS.

TABLE 8

|                       | Mean Grain Size (nm) | Standard Deviation (nm) |
|-----------------------|----------------------|-------------------------|
| Magnetic Layer        | 5.2                  | 1.9                     |
| Ru Intermediate Layer | 6.5                  | 1.7                     |
| Ta Underlayer         | 6.8                  | 1.9                     |

The mean grain size in the planar direction for every layer is smaller than respective layer thickness. An upper layer has a smaller grain size than a lower layer. The standard deviations are small, indicating almost uniform grain size. TEM image showed clear grain boundary and nearly uniform grain boundary region in the magnetic layer. The grain boundary can be considered to be generated by precipitation of $SiO_2$.

A second example was formed similar to the first example, sequentially forming an underlayer of molybdenum film, an intermediate layer of ruthenium film, a magnetic layer of a film of cobalt system, and a protective layer of carbon protective film on a plastic substrate by a sputtering method. The magnetic layer contained 20 at % of platinum, 10 at % of chromium, and 10 mol % of $SiO_2$ as a nonmetallic component, with respect to the cobalt content. Sputtering gas used was 100% argon. The sputtering conditions were the same as in the first example.

As comparative examples, magnetic recording media having layer constructions as shown in Table 9 were fabricated.

TABLE 9

| Layer Construction | |
| --- | --- |
| Comp Example 1 | substrate/Cr—16W/Mag |
| Comp Example 2 | substrate/Cr—16W/Co—42Cr/Mag |
| Comp Example 3 | substrate/Cr—16W/Co—42Cr/Ti—10Cr/Mag |

In Table 9, Mag represents the magnetic layer. Comparative Example 1 comprises an underlayer of Cr-16W (Cr:W= 84:16) with a bcc structure, but lacking an intermediate layer. Comparative Example 2 comprises an intermediate layer of Co-42Cr (Co:Cr=58:42) with an hcp structure, but the spacing between (002) planes in this intermediate layer being smaller than the spacing between (002) planes in the magnetic layer. Comparative Example 3 comprises two intermediate layers: first intermediate layer of Co-42Cr and second intermediate layer of Ti-10Cr (Ti:Cr=90:10), but the spacing between (002) planes in the first intermediate layer being smaller than the spacing between (002) planes in the second intermediate layer.

The magnetic recording media constructed as described above were subjected to measurements including coercive force Hc (Oe), product Br t (G $\mu$m) of remnant magnetic flux density Br and thickness of the magnetic layer, product Bst (G $\mu$m) of saturation magnetic flux density Bs and thickness of the magnetic layer t, squareness ratio S (=Br/Bs), and coercivity squareness ratio S* (tangent at the coercive force on the magnetization curve). The results of the measurements for these magnetic properties are given in Table 10.

TABLE 10

| | Hc (Oe) | Br t (G $\mu$m) | S | S* |
| --- | --- | --- | --- | --- |
| Example 1 | 3,630 | 40 | 0.84 | 0.76 |
| Example 2 | 3,570 | 40 | 0.89 | 0.73 |
| Comp Example 1 | 2,010 | 60 | 0.86 | 0.80 |
| Comp Example 2 | 2,840 | 70 | 0.94 | 0.77 |
| Comp Example 3 | 2,380 | 50 | 0.82 | 0.67 |

As apparent from table 10, the magnetic recording media of Examples 1 and 2 have exhibited superior magnetic properties as compared with the media of the Comparative Examples. The crystal structure, the principal crystal plane vertical to the substrate surface, and the alignment of the crystal axis were studied by X-ray diffraction and electron diffraction by the TEM. The results are shown in Table 11.

TABLE 11

| | Crystal Structure | Principal Plane | Crystal Axis Alignment |
| --- | --- | --- | --- |
| Magnetic Layer | hcp | (002) | c-axis is horizontal |
| Intermediate Layer | hcp | (002) | c-axis is horizontal |
| Ta Underlayer | bcc | (110) | nearly random |

The crystal alignment of the c-axis to the horizontal direction was revealed stronger in the magnetic layer than in the intermediate layer.

The present inventors have made extensive studies and discovered that a magnetic recording medium using a plastic substrate can be produced without substrate heating during sputtering, while still exhibiting excellent magnetic property by using an underlayer with a bcc structure, an intermediate layer with an hcp structure, and a magnetic layer with an hcp structure, and respective spacing of (110), (002), and (002) lattice planes decreasing toward upper layers, with the misfit between the spacings of the lattice planes being within 10%.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2002-054713, in its entirety, including the drawings, claims, and the specification thereof, is incorporated herein by reference.

We claim:

1. A magnetic recording medium comprising:
   a substrate;
   a nonmagnetic underlayer with a body centered cubic crystal structure formed on the substrate;
   a nonmagnetic intermediate layer with a hexagonal closest packed crystal structure formed on the nonmagnetic underlayer;
   a magnetic layer composed principally of cobalt with the hexagonal closest packed structure formed on the nonmagnetic intermediate layer; and
   a protective layer formed on the magnetic layer,
   wherein d1>d2>d3, and $0.02 \leq (d2-d3)/d2$, where d1 is a spacing between (110) planes of the underlayer, d2 is a spacing between (002) planes of the nonmagnetic intermediate layer, and d3 is a spacing between (002) planes in the magnetic layer.

2. A magnetic recording medium according to claim 1, wherein the magnetic layer contains a nonmetallic element or a nonmetallic compound in a proportion from 5 to 20 mol % with respect to content of the cobalt.

3. A magnetic recording medium according to claim 1, wherein the magnetic layer contains platinum in a proportion of 10 to 50 at % with respect to content of the cobalt.

4. A magnetic recording medium according to claim 1, wherein the magnetic layer contains a nonmetallic element or a nonmetallic compound in a proportion of 5 to 20 mol % with respect to a content of the cobalt and platinum in a proportion of 10 to 50 at % with respect to the content of the cobalt.

5. A magnetic recording medium according to claim 1, further comprising a seed layer composed of an intermetallic compound with a composition of CoTi, CoZr, CuZr, FeTi, or NiTi.

6. A magnetic recording medium according to claim 1, wherein a direction of magnetization for recording information in the magnetic layer is horizontal in relation to the substrate.

7. A magnetic recording medium according to claim 1, wherein at least one of the nonmagnetic underlayer, the nonmagnetic intermediate layer, the magnetic layer, and the protective layer is formed by sputtering.

8. A magnetic recording medium according to claim 1, wherein the thickness of the nonmagnetic underlayer is in the range of 5 to 20 nm.

9. A magnetic recording medium according to claim 1, wherein the thickness of the nonmagnetic intermediate layer is in the range of 5 to 50 nm.

10. A magnetic recording medium according to claim 1, wherein the thickness of the magnetic layer is in the range of 5 to 20 nm.

11. A magnetic recording medium according to claim 1, wherein the nonmagnetic intermediate layer is composed of a first nonmagnetic intermediate layer with a hexagonal crystal structure formed on the underlayer and a second nonmagnetic intermediate layer with a hexagonal crystal structure formed between the first nonmagnetic intermediate layer and the magnetic layer, and wherein $d1>d4>d5>d3$, where $d4$ is a spacing between (002) planes of the first nonmagnetic intermediate layer and $d5$ is a spacing between (002) planes of the second nonmagnetic intermediate layer.

12. A magnetic recording medium according to claim 1, wherein the nonmagnetic underlayer is composed of a first nonmagnetic underlayer with a body centered cubic crystal structure formed on the substrate and a second nonmagnetic underlayer with a body centered cubic crystal structure formed between the first nonmagnetic underlayer and the nonmagnetic intermediate layer, wherein $d6>d7>d2$, where $d6$ is a spacing between (110) planes in the first nonmagnetic underlayer and $d7$ is a spacing between (110) planes in the second nonmagnetic underlayer.

13. A magnetic recording medium comprising:
a substrate;
an underlayer with a body centered cubic crystal structure formed on the substrate;
an intermediate layer with a hexagonal closest packed crystal structure formed on the underlayer;
a magnetic layer composed principally of cobalt with the hexagonal closest packed structure formed on the intermediate layer; and
a protective layer formed on the magnetic layer,
wherein $d1>d2>d3$, where $d1$ is a spacing between (110) planes of the underlayer, $d2$ is a spacing between (002) planes of the intermediate layer, and $d3$ is a spacing between (002) planes in the magnetic layer,
wherein the intermediate layer is principally composed of Ru, Re, Os, or Tc.

14. A magnetic recording medium comprising:
a substrate;
an underlayer with a body centered cubic crystal structure formed on the substrate;
an intermediate layer with a hexagonal closest packed crystal structure formed on the underlayer;
a magnetic layer composed principally of cobalt with the hexagonal closest packed structure formed on the intermediate layer; and
a protective layer formed on the magnetic layer,
wherein $d1>d2>d3$, where $d1$ is a spacing between (110) planes of the underlayer, $d2$ is a spacing between (002) planes of the intermediate layer, and $d3$ is a spacing between (002) planes in the magnetic layer,
wherein the intermediate layer is principally composed of an intermetallic compound selected from $Rh_3W$, $Ni_3Sn$, $Ni_3Zr$, and $Co_3W$.

15. A magnetic recording medium comprising:
a substrate;
an underlayer with a body centered cubic crystal structure formed on the substrate;
an intermediate layer with a hexagonal closest packed crystal structure formed on the underlayer;
a magnetic layer composed principally of cobalt with the hexagonal closest packed structure formed on the intermediate layer; and
a protective layer formed on the magnetic layer,
wherein $d1>d2>d3$, where $d1$ is a spacing between (110) planes of the underlayer, $d2$ is a spacing between (002) planes of the intermediate layer, and $d3$ is a spacing between (002) planes in the magnetic layer,
wherein the underlayer is principally composed of Ta, Nb, W, or Mo.

16. A method of forming a magnetic recording medium comprising the steps of:
providing a substrate;
forming a nonmagnetic underlayer with a body centered cubic crystal structure on the substrate;
forming a nonmagnetic intermediate layer with a hexagonal closest packed crystal structure on the nonmagnetic underlayer;
forming a magnetic layer composed principally of cobalt with the hexagonal closest packed structure on the nonmagnetic intermediate layer; and
forming a protective layer on the magnetic layer,
wherein $d1>d2>d3$, and $0.02 \leq (d2-d3)/d2$, where $d1$ is a spacing between (110) planes of the nonmagnetic underlayer, $d2$ is a spacing between (002) planes of the nonmagnetic intermediate layer, and $d3$ is a spacing between (002) planes in the magnetic layer.

17. A magnetic recording medium comprising:
a substrate;
a nonmagnetic underlayer with a body centered cubic crystal structure formed on the substrate;
a nonmagnetic intermediate layer with a hexagonal closest packed crystal structure formed on the nonmagnetic underlayer;
a magnetic layer composed principally of cobalt with the hexagonal closest packed structure formed on the nonmagnetic intermediate layer; and
a protective layer formed on the magnetic layer,
wherein $d1>d3$, $0.02 \leq (d1-d2)/d1$, where $d1$ is a spacing between (110) planes of the nonmagnetic underlayer, $d2$ is a spacing between (002) planes of the nonmagnetic intermediate layer, and $d3$ is a spacing between (002) planes in the magnetic layer.

18. A magnetic recording medium comprising:
a substrate;
a nonmagnetic underlayer with a body centered cubic crystal structure formed on the substrate;
a nonmagnetic intermediate layer with a hexagonal closest packed crystal structure formed on the nonmagnetic underlayer;
a magnetic layer composed principally of cobalt with the hexagonal closest packed structure formed on the nonmagnetic intermediate layer; and
a protective layer formed on the magnetic layer,
wherein $d1>d2>d3$, $0.02 \leq (d1-d2)/d1$, and $0.02 \leq (d2-d3)/d2$, where $d1$ is a spacing between (110) planes of the nonmagnetic underlayer, $d2$ is a spacing between (002) planes of the nonmagnetic intermediate layer, and $d3$ is a spacing between (002) planes in the magnetic layer.

* * * * *